Jan. 18, 1949. P. J. SCHMITZ 2,459,458
TRAILER TOW-POLE AND HITCH
Filed April 7, 1947
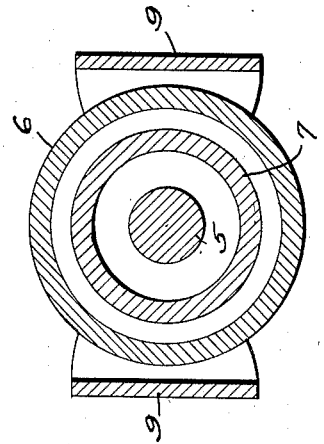
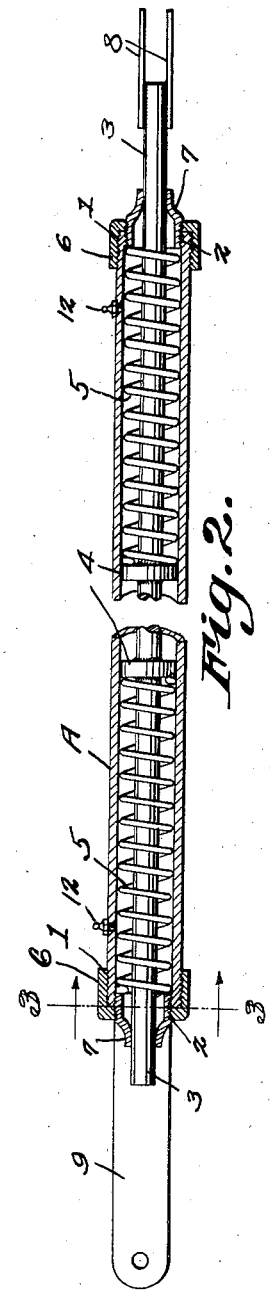
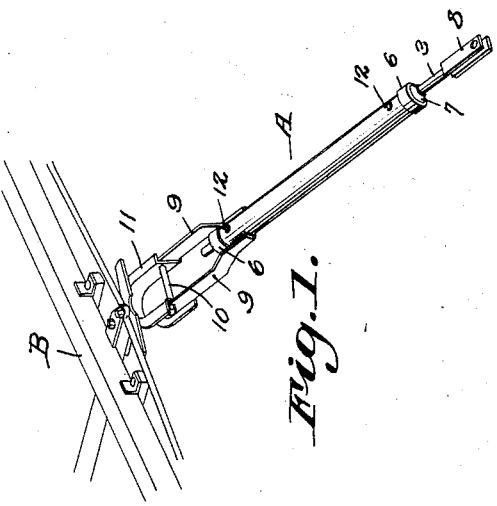
P. J. Schmitz
INVENTOR
BY C. A. Snow & Co.
ATTORNEYS.

Patented Jan. 18, 1949

2,459,458

UNITED STATES PATENT OFFICE 2,459,458

TRAILER TOW-POLE AND HITCH

Philip J. Schmitz, Sleepy Eye, Minn.

Application April 7, 1947, Serial No. 739,737

1 Claim. (Cl. 280—33.14)

This invention relates to new and useful improvements in trailer tow-poles and hitches of which the following is a specification.

The primary object of this invention resides in the provision of an improved tow-pole adapted to be permanently secured to the tongue of a trailer at one end and quickly detachably secured to a powered vehicle at the second end.

Another object of this invention is the provision of a towing hitch of the nature set forth which is particularly adapted to be permanently secured to the steering tongue of a four wheel trailer or wagon at one end thereof and to be quickly detachably hitch by threaded, ball joint, or other conventional means to the rear of a powered vehicle.

Still another object of this invention resides in the provision of a towing hitch as set forth which is so constructed as to provide a resilient double cushioning action between the trailer and the powered vehicle thus reducing shock and stresses set up between the two vehicles during the normal towing operation. This action of resilient cushioning is doubly valuable in the case of trailers of four wheeled agricultural type which are usually of a springless type, as is the partially universal action inherent in the towing hitch described allowing easy angular adjustments between the towing and towed vehicles on uneven road surfaces.

Another and still further object and advantage of this invention is in the provision of a towing hitch as set forth which is of an extremely simple, durable, and inexpensive design and construction, and a device which may be easily and quickly secured to a trailer of substantially any make or design for dependable and satisfactory performance.

Still further objects and advantages of this invention will readily appear to those skilled in the art when the following description is read in the light of the accompanying drawings in which:

Fig. 1 is a perspective view of the hitch.

Fig. 2 is a longitudinal cross section of Fig. 1.

Fig. 3 is a vertical section taken on line 3—3 of Fig. 1.

Referring now to the accompanying drawings which illustrate the preferred embodiment of this invention and in which like numerals indicate similar parts throughout A designates an elongated cylindrical tube open at each end thereof and provided with external threads 1 and internal threads 2 for a spaced distance inward thereof.

An elongated circular rod 3, of a greater length than the tube, is slidably mounted within the tube in an extending position from each end thereof, and said rod is provided with a pair of circular collars 4 rigidly secured thereabout at equally spaced distances inward from each end of said tube.

A pair of identical coil springs 5 are slidably positioned one about each end of the rod 3 within said tube and with their inward ends seating against the collars 4.

An internally threaded coupling 6 is then secured about each end of the tube A and a reducer 7 is threaded therein forming a bearing opening for the extension of the rod 3 and forming an external seat for the spring 5 compressing said springs within said tube against the collars 4.

A pair of parallel ears 8 are welded to the forward extended end of the rod 3 adapted to be coupled to a vehicle supported hitch or to support a ball type coupling to be secured to a universal hitch.

A pair of elongated bowed parallel arms 9 are secured longitudinally with and in an extended rearwardly position from the tube A in a rigid condition and said arms are adapted to be secured by a bolt 10 or the like to the steering tongue 11 of the trailer B.

Thus it may be seen that when said forward ears 8 are hitched to a powered vehicle that the vehicle is securely tied to the rod 3 while the trailer is secured to the tube A so that any relative movement of the vehicles is transmitted through the springs 5 from the rod to the tube or from the tube to the rod forming a resiliently cushion towing hitch adapted to absorb the shocks and strains of the towing operation.

Additionally it may be seen that because of the free rotation of the tube and the rod 3 relative to each other that a universal freedom is provided to allow for rough and uneven road surfaces causing the different angularity of the two vehicles.

Two grease fittings 12 are provided one at each end of said tube permitting the lubrication of the moving parts of said hitch to maintain them in good working condition at all times.

Thus it may be seen that an improved simple and desirable towing hitch has been provided which is of an inexpensive and easily operable construction.

Having thus described and explained the construction and function of this invention and with full belief that modifications in size, shape, materials used, and general characteristics would not constitute a departure from the spirit of the invention what I desire to claim in Letters Patent is:

A towing hitch of the character described comprising, an elongated open ended cylindrical tube, internal and external threads formed inwardly for a spaced distance from each of said ends, an elongated circular rod slidably carried within and extending from each end beyond said tube, a pair of circular collars carried about said rod each at an equally spaced distance inward from the adjacent end of said tube, a pair of coil springs carried one about each end of said rod without and in abutment with the adjacent collar, a threaded coupling secured about each end of said tube, a reducer carried by each coupling abutting with and compressing said springs against said collars while permitting the sliding extension of said rod, means carried by one end of said rod adapting it to be quickly detachably coupled to a powered vehicle, and means carried by that end of said tube opposite said rod end adapted to be rigidly secured to the steering tongue of a trailer wagon in the manner and for the purpose described.

PHILIP J. SCHMITZ.

REFERENCES CITED

The following references are of record in the file of this patent:

UNITED STATES PATENTS

| Number | Name | Date |
|---|---|---|
| 1,289,141 | Ferris | Dec. 31, 1918 |
| 2,133,195 | Howard | Oct. 11, 1938 |
| 2,444,305 | Milhizer | June 29, 1948 |

FOREIGN PATENTS

| Number | Country | Date |
|---|---|---|
| 706,806 | France | June 30, 1931 |